(12) United States Patent
Wang et al.

(10) Patent No.: US 10,891,264 B2
(45) Date of Patent: Jan. 12, 2021

(54) DISTRIBUTED, SCALABLE KEY-VALUE STORE

(71) Applicant: VMware, Inc., Palo Alto, CA (US)

(72) Inventors: Wenguang Wang, Santa Clara, CA (US); Radu Berinde, Cambridge, MA (US)

(73) Assignee: VMWARE, INC., Palo Alto, CA (US)

( * ) Notice: Subject to any disclaimer, the term of this patent is extended or adjusted under 35 U.S.C. 154(b) by 672 days.

(21) Appl. No.: 14/700,615

(22) Filed: Apr. 30, 2015

(65) Prior Publication Data

US 2016/0321294 A1 Nov. 3, 2016

(51) Int. Cl.
*G06F 16/182* (2019.01)
*H04L 29/08* (2006.01)

(52) U.S. Cl.
CPC ........ *G06F 16/182* (2019.01); *H04L 67/1097* (2013.01); *H04L 67/2842* (2013.01)

(58) Field of Classification Search
CPC ........... G06F 17/30194; H04L 67/1097; H04L 67/2842
See application file for complete search history.

(56) References Cited

U.S. PATENT DOCUMENTS

| | | | |
|---|---|---|---|
| 8,775,763 B2* | 7/2014 | Merchant | G06F 3/0607 707/640 |
| 8,943,282 B1* | 1/2015 | Armangau | G06F 16/128 711/162 |
| 9,369,332 B1* | 6/2016 | Smith | H04L 67/2842 |
| 9,703,788 B1* | 7/2017 | Bent | G06F 17/30094 |
| 9,742,863 B2* | 8/2017 | Guerin | G06F 15/17331 |
| 9,807,092 B1* | 10/2017 | Gutzmann | H04L 63/1458 |
| 10,055,352 B2* | 8/2018 | Wei | G06F 11/1471 |
| 2008/0168102 A1* | 7/2008 | Parimi | G06Q 10/00 |
| 2011/0137865 A1* | 6/2011 | Shin | G06F 11/1458 707/648 |
| 2011/0246518 A1* | 10/2011 | Mehrotra | H04L 67/2842 707/770 |
| 2012/0036317 A1* | 2/2012 | Torii | G06F 16/90339 711/108 |
| 2013/0036136 A1* | 2/2013 | Horii | G06F 16/2343 707/770 |
| 2013/0218840 A1* | 8/2013 | Smith | G06F 11/1662 707/639 |
| 2014/0032842 A1* | 1/2014 | Goshi | G06F 12/00 711/115 |
| 2014/0047190 A1* | 2/2014 | Dawkins | G06F 12/0871 711/136 |

(Continued)

*Primary Examiner* — Taelor Kim
*Assistant Examiner* — Abdullah A Daud (57) ABSTRACT

Techniques for implementing a distributed, scalable key-value store (DSKVS) across a plurality of nodes are provided. In one embodiment, each node in the plurality of nodes can store: (1) a hash table in a nonvolatile storage of the node, where the hash table is configured to hold a partition of a total set of key-value data maintained by the DSKVS; (2) a logical log in the nonvolatile storage, where the logical log is configured to hold transaction log records corresponding to key-value update operations performed on the node; and (3) a cache in a volatile memory of the node, where the cache is configured to hold key-value data that has been recently updated on the node via one or more of the key-value update operations.

18 Claims, 6 Drawing Sheets

(56) References Cited

U.S. PATENT DOCUMENTS

| | | | |
|---|---|---|---|
| 2014/0365527 A1* | 12/2014 | Fuchs | G06F 21/6227 |
| | | | 707/786 |
| 2015/0278101 A1* | 10/2015 | Zhou | G06F 12/0811 |
| | | | 711/119 |
| 2015/0293856 A1* | 10/2015 | Zhang | G06F 12/0868 |
| | | | 711/114 |
| 2016/0077980 A1* | 3/2016 | Tomlin | G06F 16/20 |
| | | | 711/135 |
| 2016/0117252 A1* | 4/2016 | Thangaraj | G06F 11/1441 |
| | | | 711/118 |
| 2016/0170911 A1* | 6/2016 | Devgan | G06F 12/0813 |
| | | | 711/118 |
| 2017/0039145 A1* | 2/2017 | Wu | H04L 63/06 |
| 2018/0004748 A1* | 1/2018 | Rao | G06F 16/2255 |

* cited by examiner

DISTRIBUTED, SCALABLE KEY-VALUE STORE

BACKGROUND

A key-value store is a type of database that allows clients to store and retrieve data in the form of key-value pairs. The key in a key-value pair is an identifier (e.g., number, string, etc.) that uniquely identifies its paired value. The value in a key-value pair can be any type of data object or collection of data objects. A typical key-value store exposes update (e.g., PUT and DELETE) and lookup (e.g., GET) operations to clients. For instance, the PUT operation stores one or more specified key-value pairs in the key-value store, the DELETE operation deletes key-value pairs identified by one or more specified keys from the key-value store, and the GET operation retrieves the values for one or more specified keys from the key-value store.

Key-value stores can be distributed or non-distributed. A distributed key-value store is configured to store key-value data in a decentralized fashion across a number of distinct computer systems, referred to as nodes. Further, a distributed key-value store can allow clients to invoke key-value operations such as PUT, GET, and DELETE on any one of the multiple nodes. In contrast, a non-distributed key-value store is configured to store all key-value data, as well as consolidate all key-value operation processing, on a single computer system. Distributed key-value stores are generally preferred over non-distributed key-value stores in environments where scalability and fault-tolerance are important for day-to-day operation (e.g., enterprise environments, cloud infrastructures, etc.).

Many of the distributed key-value stores that are deployed in enterprise/cloud environments today make use of a data structure known as a log-structured-merge (LSM) tree for storing key-value pairs. LSM trees exhibit certain characteristics that can further enhance the scalability, performance, and consistency of key-value data/operations. Unfortunately, LSM trees are complex in nature and more difficult to implement than other types of data structures, such as hash tables, binary search trees, and so on. As a result, distributed key-value stores that rely on LSM trees as their data store layer require significantly more programmer time and effort to develop and maintain than non-LSM tree-based key-value stores.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

I. Overview

The present disclosure is directed to a distributed, scalable key-value store that provides many of the same benefits as LSM tree-based key-value stores, but with considerably less code complexity.

At a high level, the distributed, scalable key-value store (or "DSKVS") described herein comprises three types of data components: a per-node hash table, a per-node logical log, and a per-node in-memory writeback cache. The per-node hash table is configured to store, for a given node, key-value data corresponding to a key namespace subset that is assigned to that node. This key-value data is stored within distinct buckets in the hash table based on a node-level hash function. The per-node logical log is configured to store transaction log records for key-value update operations (e.g., PUT or DELETE operations) that are performed on the node. And the per-node in-memory writeback cache is configured to maintain, in the node's volatile memory (e.g., RAM), key-value pairs that have been recently updated on the node.

In various embodiments, the DSKVS can leverage the foregoing data components in a manner that realizes many of the same scalability, performance, and data consistency benefits that are provided by an LSM tree-based distributed key-value store. For example, as explained in the sections that follow, the DSKVS can leverage these components to enable (1) fast key-value updates (with blind writes and small write amplification), (2) fast lookups, (3) load balancing across nodes, and (4) crash consistent operation. A blind write to an entry is one that occurs without having to first read the entry from disk. Write amplification is the need to write a large block of data for a relatively small amount of updated data.

At the same time, the actual algorithms and code needed to implement the DSKVS of the present disclosure can be substantially less complicated than LSM-tree based implementations. This is partially due to the fact that, in certain embodiments, the DSKVS does not order key-value data on disk (while LSM tree-based implementations do). Instead, as mentioned above, key-value pairs are distributed among the buckets of each per-node hash table via a node-level hash function, without any implicit or explicit ordering. This approach reduces code complexity, at the cost of making certain key-value operations that rely on on-disk ordering (e.g., SCAN operations) less efficient. For many key-value store use cases, order-dependent key-value operations are not needed. Accordingly, in these scenarios, the DSKVS of the present disclosure provides an attractive alternative to LSM tree-based key value stores because it is simpler to implement and yet offers similar scalability/performance/consistency characteristics.

II. System Architecture

Figure 1:
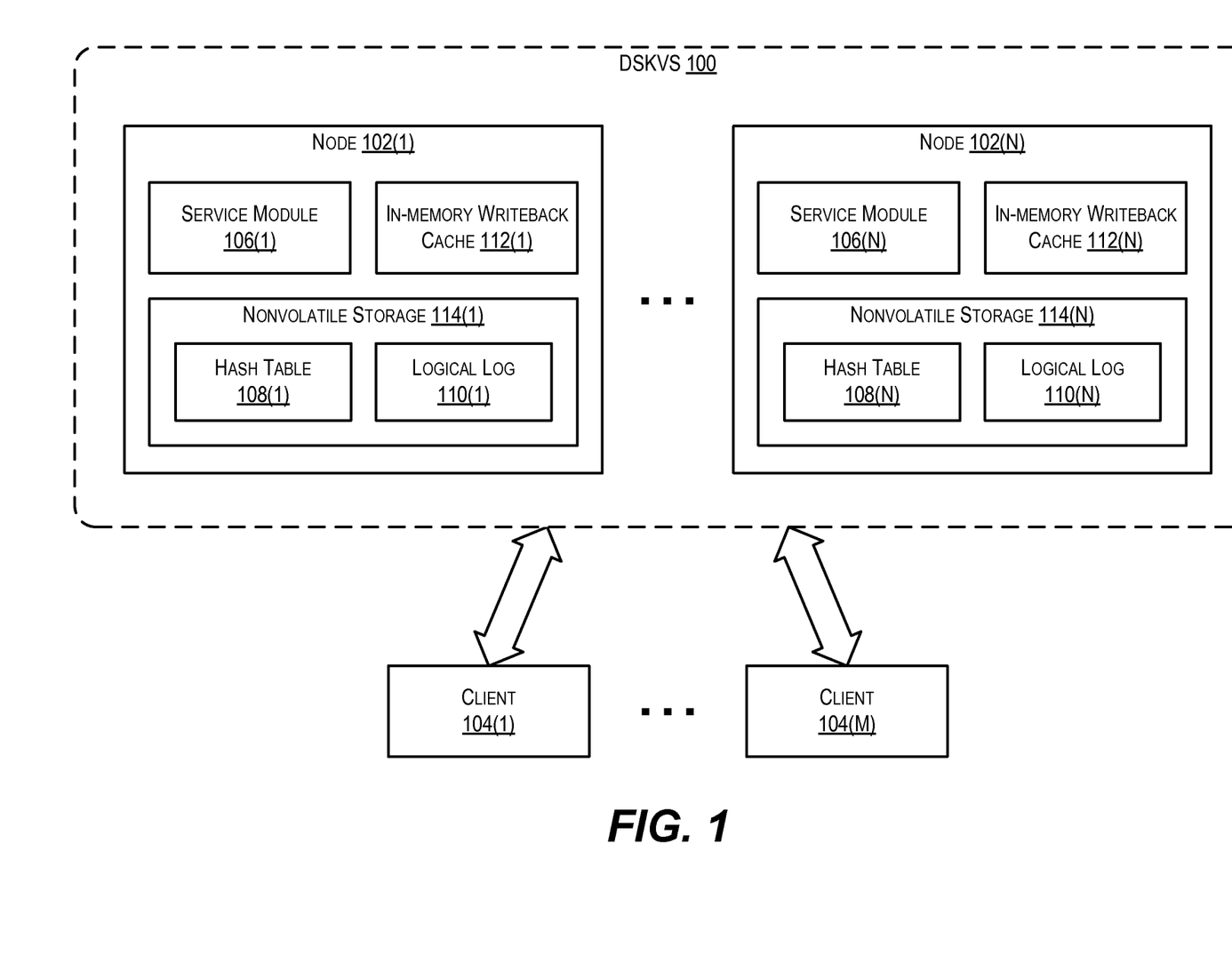
FIG. 1 depicts a system architecture of a distributed, scalable key-value store according to an embodiment.

FIG. 1 depicts a system architecture of a distributed, scalable key-value store (DSKVS) 100 according to an embodiment. As shown, DSKVS 100 includes a set of nodes 102(1) to 102(N). Nodes 102(1)-(N) can be implemented using physical computing devices (e.g., server systems, personal (e.g., desktop or laptop) computer systems, etc.), virtual computing devices (e.g., virtual machines), or a combination thereof. Further, nodes 102(1)-(N) can be connected to each other via a network or combination of networks (not shown), such as a local area network (LAN), a wide area network (WAN), and/or the Internet.

Each node 102 in DSKVS 100 includes a service module 106. These service modules are software and/or hardware-based components that carry out the main processing tasks of DSKVS 100. For example, each service module 106 can expose, to one or more clients 104(1)-(M), operations for updating or looking up key-value pairs in DSKVS 100. Upon receiving an invocation of a particular key-value operation from a client 104, service module 106 can execute the operation and return a response (if appropriate) to the client. In a particular embodiment, service modules 106(1)-(N) can expose the following key-value operations:

1) PUT(key K, value V)—Stores the specified key-value pair <K, V>
2) DELETE (key K)—Deletes the key-value pair corresponding to key K
3) GET(key K)—Retrieves the key-value pair corresponding to key K In addition to service module 106, each node 102 includes data components comprising a hash table 108, a logical log 110, and an in-memory writeback cache 112. As shown, hash table 108 and logical log 110 are stored in a nonvolatile storage 114 of node 102. Nonvolatile storage 114 can be implemented using, e.g., one or more magnetic disks, one or more solid-state disks, and/or the like. In contrast, in-memory writeback cache 112 is maintained in a volatile memory (e.g., RAM) of node 102. Data components 108, 110, and 112 are discussed in turn below.

II.A Hash Table

Hash tables 108(1)-(N) of nodes 102(1)-(N) are configured to store the actual key-value data maintained by DSKVS 100. In various embodiments, each hash table 108 can store a disjoint partition of the key-value data of DSKVS 100, where the data partition corresponds to a key namespace subset assigned to the hash table's host node 102. As used here, the term "disjoint partition" means there each per-node hash table stores a separate, non-overlapping group of key-value pairs, such that no key-value pair belongs to more than one partition. This partitioning can be accomplished by, e.g., applying a system-level hash function to the key of a key-value pair at the time the pair is submitted for insertion/update in DSKVS 100, and subsequently storing the key-value pair in the hash table of a particular node that is uniquely mapped to the resulting hash value. With this partitioning scheme, the storage and processing of key-value data in DSKVS 100 can be load balanced across nodes 102(1)-(N).

Each hash table 108 can be organized as an array or list of buckets. When a key-value pair <K, V> is identified for insertion/update in the hash table of a particular node 102 (per, e.g., the system-level hash function noted above), service module 106 of the node can apply a node-level hash function to key K that generates a bucket index for <K, V>. Service module 106 can then, at an appropriate time, persist <K, V> in the bucket of hash table 108 identified by the bucket index.

In certain embodiments, the buckets of hash table 108 can have a fixed size that is a multiple of the size of the individual key-value pairs maintained by DSKVS 100. For example, if each key-value pair consumes 16 bytes, each bucket can have a size of 2 KB (128× multiple of 16), 4 KB (256× multiple of 16), or more. This allows a large number of key-value pairs to fit into a single bucket, which reduces the likelihood that a given bucket will run out of space (i.e., overflow) due to too many hash collisions. In a particular embodiment, in order to support data consistency when performing hash bucket updates, the size of each bucket may be no larger than the block size that nonvolatile storage 114 can atomically update. This block size is typically 4 KB for solid-state disks and some newer magnetic hard disks, and 512 bytes for other magnetic hard disks.

Further, each bucket can include a metadata field referred to as a "bucket transaction ID." This field, which is used to ensure data consistency in scenarios where node 102 crashes while writing key-value pairs to hash table 108, is explained in further detail below.

II.B Logical Log

Logical logs 110(1)-(N) are configured to store state information regarding transactions (i.e., key-value operations) that are executed by respective service modules 106(1)-(N) of nodes 102(1)-(N). Each logical log 110 can be organized as an array or list of records referred to as transaction log records. The service module 106 associated with a given logical log 110 can generate these transaction log records as the service module carries out update (e.g., PUT and DELETE) operations that modify the key-value pairs stored in hash table 108.

Each transaction log record can include the data for the key-value pair being updated (i.e., key K and value V) and a unique transaction ID. In the case of a DELETE operation, value V may be null. In certain embodiments, value V may be stored in the transaction log record as a "delta" value (e.g., +2). This may occur if the client that invoked the update operation is configured to track such delta values, rather than absolute values. Each transaction log record can also store absolute values for V if provided by the client.

The transaction ID in each transaction log record can be a number that is sequentially incremented for each new transaction log record. This transaction ID will typically be unique in the context of its host node.

In a particular embodiment, as service module 106 generates transaction log records during its runtime operation, service module 106 can append these records to the end of logical log 110 (via, e.g., an atomic append operation). In this embodiment, service module 106 cannot insert new transaction log records at the start or middle of logical log 110, or modify existing transaction log records in the logical log. Thus, logical log 110 may include multiple transaction log records for the same key if that key is updated multiple times. For instance, consider the following exemplary logical log:

key: K1 value: V1 transactionID: 1
key: K1 value: V2 transactionID: 2
key: K1 value: V3 transactionID: 3

In this example, there are three transaction log records that pertain to three separate update operations performed with respect to key K1. The last transaction with transaction ID 3 reflects the most recent operation. In a scenario where value V3 identified in this last record is an absolute value, the previous two transaction log records can be considered historic records that are superseded by the last record. In a scenario where value V3 identified in the last record is a delta value, one (or both) of the previous two transaction log records may still affect the final value for key K1 that is ultimately written to hash table 108.

II.C In-Memory Writeback Cache

Each in-memory writeback cache 112 is configured to hold, in the volatile memory of its host node 102, cache entries corresponding to key-value pairs that have been recently modified on that node. Each cache entry can specify the key K and value V for a modified key-value pair. In certain embodiments, each cache entry can also include metadata (e.g., a "dirty" flag) indicating whether the entry has been propagated to hash table 108. As described in the sections that follow, service module 106 can leverage these cache entries to speed up the execution of key-value operations.

Like logical log 110, the data values that are stored in in-memory writeback cache 112 can be delta or absolute values (depending on what is provided as input from the client). However, unlike logical log 110, in-memory writeback cache 112 will generally hold only one cache entry per key. In cases where multiple update operations are invoked with respect to the same key (resulting in multiple potential cache entries), service module 106 can merge together the multiple entries into a single cache entry (discussed in Section III.A below).

III. Service Module Processes

With the foregoing system architecture of DSKVS 100 in mind, the following sections describe various processes that can be implemented by service modules 106(1)-(N) of nodes 102(1)-(N) to efficiently carry out key-value operations (e.g., update and lookup operations) and to recover from crashes in a consistent manner. Generally speaking, these processes enable DSKVS 100 to achieve a level of scalability, performance, and data consistency that is comparable to LSM tree-based key-value stores.

III.A Update

Figure 2:
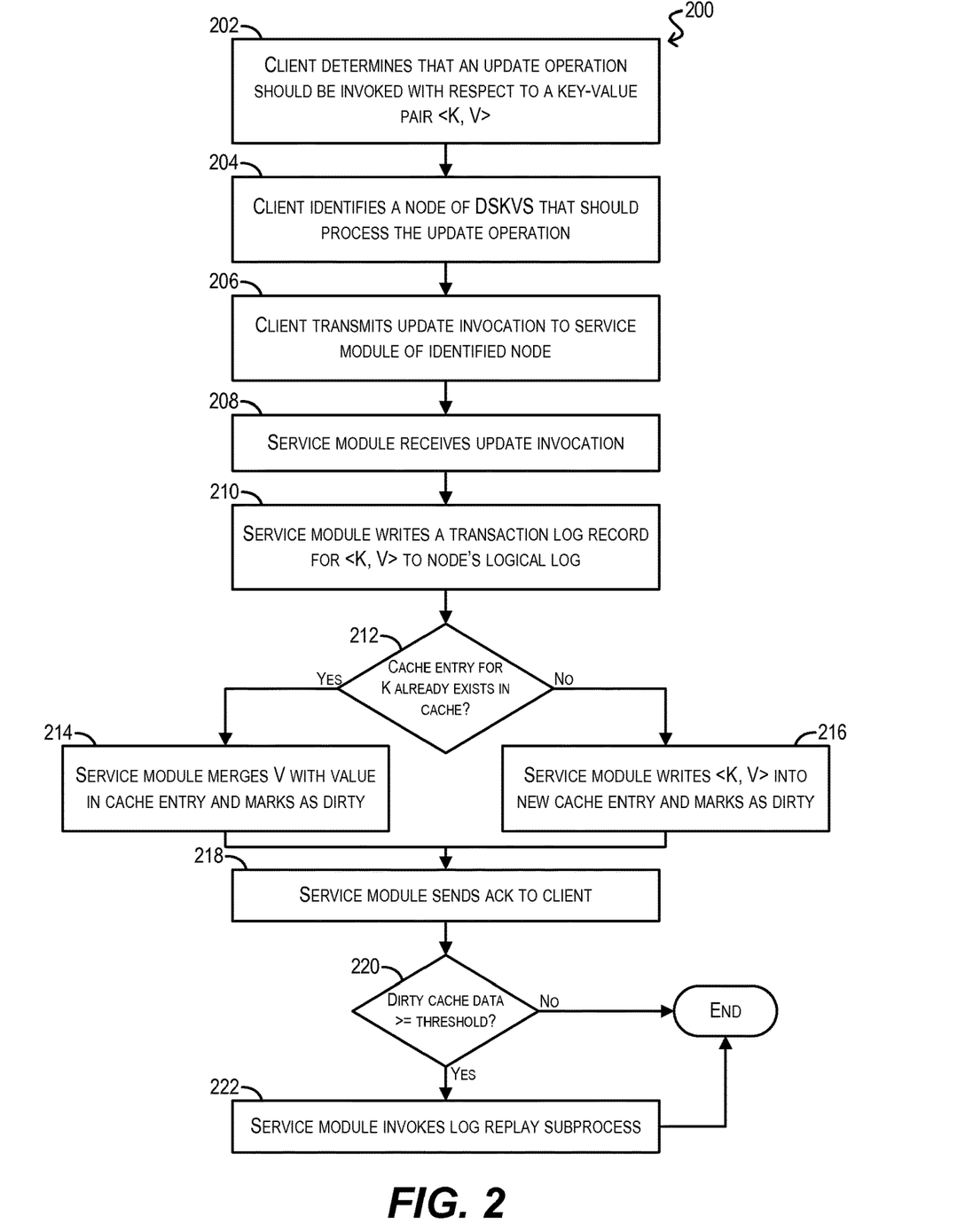
FIG. 2 depicts a flowchart of a key-value update process according to an embodiment.

FIG. 2 depicts a flowchart of a process 200 that can be implemented by a service module 106 of DSKVS 100 (in conjunction with a requesting client 104) for executing a key-value update operation in accordance with an embodiment. With this process, the service module can ensure that key-value updates are performed quickly and efficiently (via, e.g., blind writes and small write amplification).

Starting with block 202, a client 104 can determine that an update (e.g., PUT or DELETE) operation should be invoked with respect to a key-value pair <K, V>. In the case of a PUT, value V can be a delta value (e.g., +/−X) or an absolute value (e.g., X). In the case of a DELETE, value V can be null.

At block 204, client 104 can identify a node of DSKVS 100 that should process the update operation. As discussed in Section II.A, each node can store a disjoint partition of the total key-value data maintained by DSKVS 100 for load balancing purposes. Accordingly, as part of block 204, client 104 can identify which node is configured to store the particular data partition that includes key K. In one embodiment, this partitioning can be based on a system-level hash function, where the possible hash values of the system-level hash function are uniquely mapped to nodes 102(1)-(N) respectively. In this embodiment, client 104 can carry out block 204 by applying the system-level hash function to key K and identifying the node that is mapped to the resulting hash value. In other embodiments, other identification techniques can be used.

Upon identifying the node at block 204, client 104 can transmit an invocation of the update operation to the service module (106) of the node (block 206).

At block 208, service module 106 can receive the update invocation from client 104. In response, service module 106 can write a transaction log record for the updated key-value pair <K, V> to the node's logical log 110 (block 210). As discussed in Section II.B, this transaction log record can include the key-value pair itself and a unique, sequentially-increasing transaction ID. Service module 106 can perform this write using an atomic operation.

Service module 106 can then check whether a cache entry for key K already exists in the node's in-memory writeback cache 112 (block 212). If so, service module 106 can merge value V with the value in the existing cache entry (block 214). For example, if value V is +5 and the value in the existing cache entry is −2, service module 106 can update the existing cache entry with value +3. Otherwise, service module 106 can simply write <K, V> as a new cache entry into in-memory writeback cache 112 (block 216). In either case, service module 106 can mark the new/existing cache entry as dirty (since the entry contains new data that has not yet been flushed to hash table 108). Service module 106 can subsequently send an acknowledgement to client 104 indicating that the update operation is complete (block 218).

Once the acknowledgement has been sent, service module 106 can check whether the amount of dirty data in in-memory writeback cache 112 now exceeds a predefined threshold (block 220). If so, service module 106 can initiate a "log replay" subprocess (described in the next subsection) for flushing the dirty data in cache 112 to the node's hash table 108 (block 222). As part of this step, service module 106 can pass the transaction ID of the latest transaction log record in logical log 110 as input to the log replay subprocess (referred to as the "latest transaction ID").

On the other hand, if the predefined threshold is not exceeded at block 220, update process 200 can end.

III.A.1 Log Replay

Figure 3:
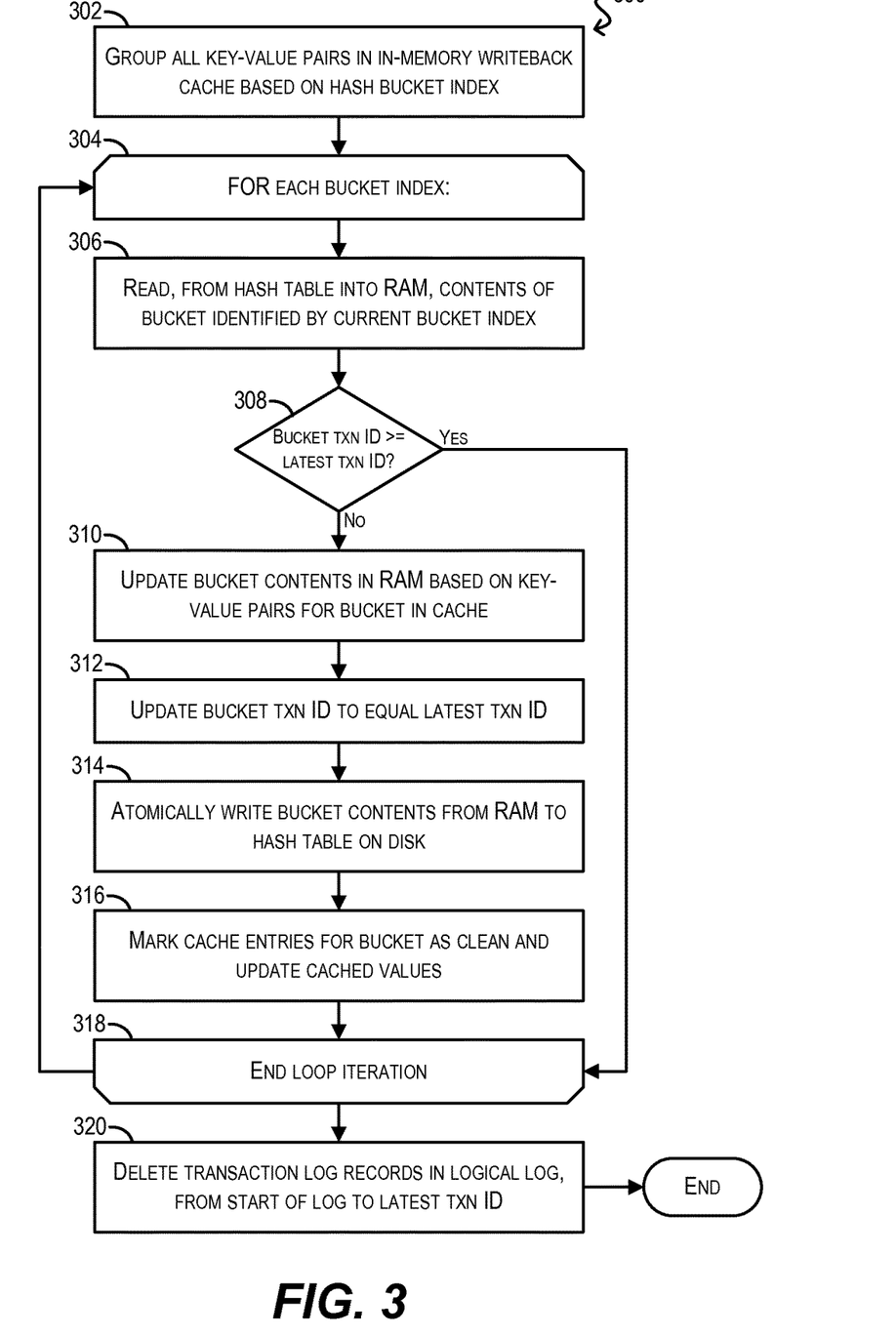
FIG. 3 depicts a flowchart of a log replay subprocess according to an embodiment.

FIG. 3 depicts a flowchart of a log replay subprocess 300 that can be implemented by a service module 106 of DSKVS 100 according to an embodiment. As noted above, service module 106 can execute subprocess 300 as part of update process 200 of FIG. 2 for the purpose of flushing dirty key-value data from in-memory writeback cache 112 to hash table 108 if deemed necessary at decision block 220. Service module 106 can also execute log replay subprocess 300 as part of a node recovery process to ensure that the key-value data in hash table 108 remains consistent in the face of unexpected failures/crashes (discussed in Section III.B below).

At block 302, service module 106 can group all key-value pairs in in-memory writeback cache 112 according to hash bucket index. Service module 106 can perform this grouping by, e.g., applying the node-level hash function to the key of each key-value pair and sorting the pairs using the resulting hash values.

It should be noted that, in some embodiments, in-memory writeback cache can be implemented as a data structure that is already ordered by bucket index (e.g., a binary tree). In these embodiments, block 302 can be omitted.

At block 304, service module 106 can enter a loop for each hash bucket index. Within the loop, service module 106 can first read, from on-disk hash table 108 into RAM, the contents of the bucket identified by the current bucket index (block 306). These contents can include the key-value pairs stored in the bucket, as well as the bucket's "bucket transaction ID" field.

Service module 106 can then check whether the bucket transaction ID is greater than or equal to the "latest transaction ID" passed into the log replay subprocess (block 308).

If so, this means that the bucket has already been updated with all of the key-value data in logical log 110 up to (and possibly beyond) the transaction log record identified by the latest transaction ID. Thus, service module 106 can skip to the end of the current loop iteration (block 318).

On the other hand, if the bucket transaction ID is less than the latest transaction ID, service module 106 can update, in RAM, the contents of the bucket based on the cached key-value pairs for the bucket found in writeback cache 112 (block 310). For example, service module 106 can: (1) add a new key-value pair to the bucket if such a new key-value pair is found in cache 112; (2) overwrite the value for a given key-value pair in the bucket if a different, absolute value for the same key is found in cache 112; (3) calculate an updated value for a given key-value pair in the bucket if one or more delta values for the same key are found in cache 112; and (4) delete a given key-value pair from the bucket if the value for the same key is null in cache 112.

Service module 106 can also update the bucket's bucket transaction ID to be equal to the latest transaction ID (block 312).

Once the bucket contents have been updated in RAM per blocks 310 and 312, service module 106 can write those contents back to hash table 108 on disk (block 314). Service module 106 can perform this step using, e.g., an atomic write operation that is made available by nonvolatile storage 114 of FIG. 1 and/or a file system layer of node 102. In embodiments where nonvolatile storage 114 only supports atomic writes for data blocks that are equal in size to the storage device's hardware block size, the size of each bucket can be aligned with this hardware block size.

Service module 106 can then mark all of the cache entries in in-memory writeback cache 112 that belong to the current bucket as being clean, and can update the values for those cache entries with absolute values, as calculated at block 310, if they previously contained delta values (block 316). By updating cache 112 with absolute values, future lookups for the key-value pairs included in those cache entries can be accelerated (see Section III.D below).

It should be noted that there will typically be a cache management process that runs in the background of node 102 and is responsible for removing clean entries from in-memory writeback cache 112 on an as-needed basis (e.g., per a predefined eviction policy once cache 112 is close to full). This process can be implemented using any of a number of existing cache management techniques that are known in the art.

After block 316, the current loop iteration can end (block 318), and service module 106 can return to the start of the loop to process any remaining hash buckets. Once all buckets have been processed, service module 106 can delete all transaction log records in logical log 110 up to the record identified by the latest transaction ID (block 320) and the log replay subprocess can terminate.

With update process 200 and log replay subprocess 300 described above, each service module 106 of DSKVS 100 can quickly and efficiently carry out key-value update operations. For example, per blocks 212-218 of process 200, service module 106 can blindly write updated key-value data to in-memory writeback cache 112, and can immediately return a write acknowledgement to the client.

Further, per loop 304 of subprocess 300, service module 106 can batch together all of the key-value updates for a given hash bucket and can write the updates, via a single write operation, to disk. This can significantly reduce write amplification in scenarios where (1) each key-value pair is smaller than the bucket size, and (2) there are enough dirty cache entries in cache 112 to batch together a significant number of updates into a single write.

Generally speaking, the amount of dirty data that is flushed from in-memory writeback cache 112 to on-disk hash table 108 will depend on the threshold parameter that is evaluated at decision block 220 of FIG. 2. This threshold parameter can be tuned as needed (using, e.g., empirical data for a given deployment) to minimize write amplification while ensuring that cache 112 is flushed on a timely basis.

III.B Recovery

Figure 4:
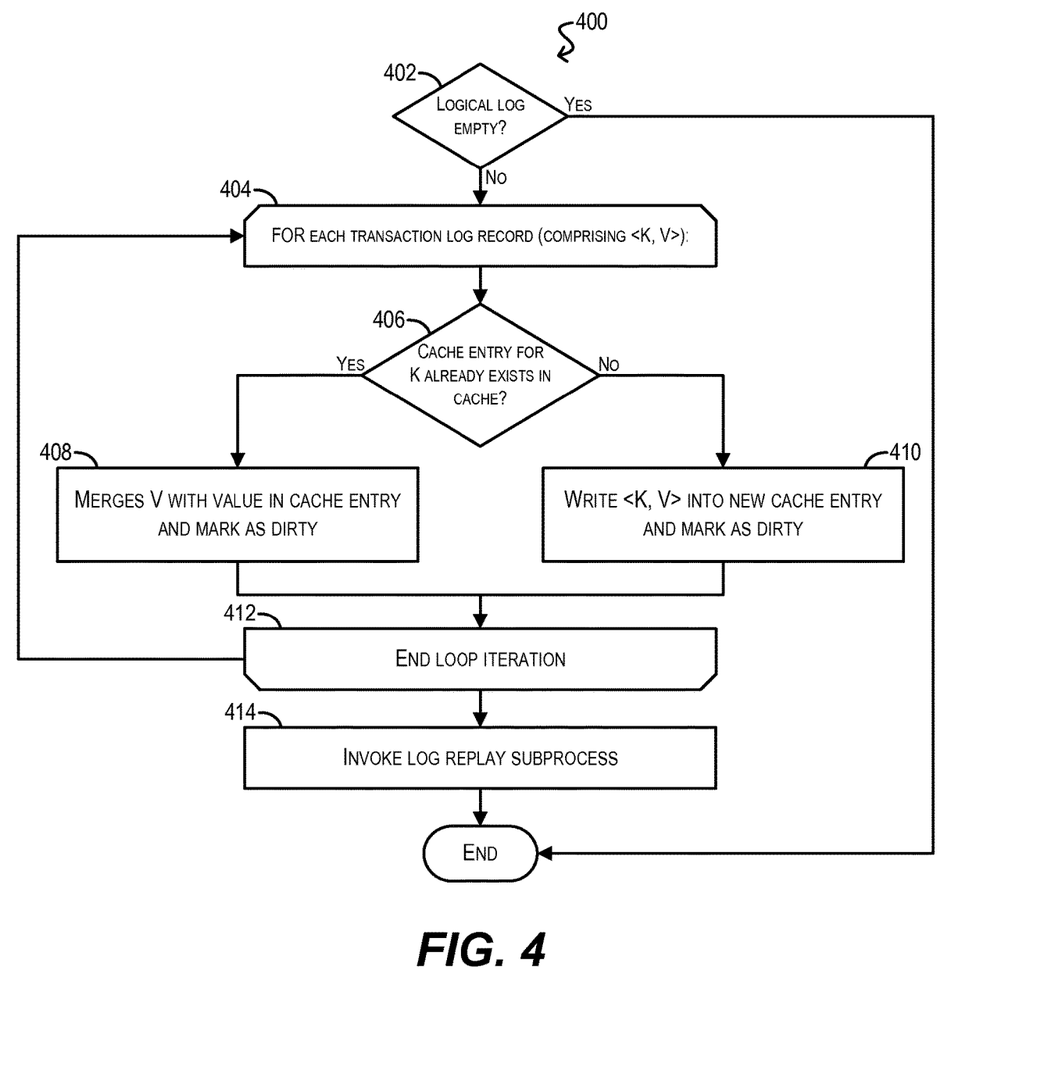
FIG. 4 depicts a flowchart of a node recovery process according to an embodiment.

In cases where a node 102 of DSKVS 100 crashes/fails during its runtime operation, it is important that any key-value data in the node's logical log 110 that has not yet been flushed to the node's hash table 108 is flushed upon reboot. This enables hash table 108 to reach a consistent state after the crash/failure. FIG. 4 depicts a flowchart of a recovery process 400 that can be executed by the node's service module 106 for carrying out this task according to an embodiment. It is assumed that recovery process 400 is initiated during the initialization sequence of node 102.

Starting with block 402, service module 106 can check whether the node's logical log 110 is empty. If so, there is no key-value data to flush, and thus process 400 can terminate.

If the logical log 110 is not empty (i.e., it contains one or more transaction log records), service module 106 can enter a loop for each record (comprising key-value pair <K, V>) in the log (block 404). Within the loop, service module 106 can check whether a cache entry for key K already exists in the node's in-memory writeback cache 112 (block 406). If so, service module 106 can merge value V with the value in the existing cache entry (block 408). Otherwise, service module 106 can write <K, V> as a new cache entry into in-memory writeback cache 112 (block 410). In either case, service module 106 can mark the new/existing cache entry as dirty.

Upon writing the key-value data for the current transaction log record to in-memory writeback cache 112, the current loop iteration can end (block 412) and service module 106 can return to the start of the loop to process any remaining transaction log records in logical log 110.

Once all transaction log records have been processed, service module 106 can initiate log replay subprocess 300 described in Section III.A.1 above to propagate the cache entries to hash table 108 (block 414). As part of this step, service module 106 can pass to the log replay subprocess the latest transaction ID in logical log 110.

Finally, upon completion of the log replay subprocess, recovery process 400 can end.

With recovery process 400 and log replay subprocess 300 described above, each node 102 of DSKVS 100 can recover from crashes/failures in a manner that ensures consistency of the key-value data persisted in the node's hash table 108. This is due to the fact that all update operations are captured in logical log 110 before those operations are acknowledged to the client per update process 200 of FIG. 2.

It should be appreciated that, even if node 102 crashes during recovery process 400 or log replay subprocess 300, the data in hash table 108 will still reach a consistent state upon reboot. This is because recovery process 400 will be restarted, and log replay subprocess 300 will skip any hash buckets that have already been updated on disk due to a previous invocation of the log replay (by examining the bucket transaction ID at block 308 of FIG. 3). Further, the use of an atomic write operation to write each hash bucket to disk (per block 314) ensures that the bucket transaction ID and key-value pairs for the bucket will not be written in a partial manner due to a crash; either they will all be written or none will be written.

III.C Lookup

Figure 5:
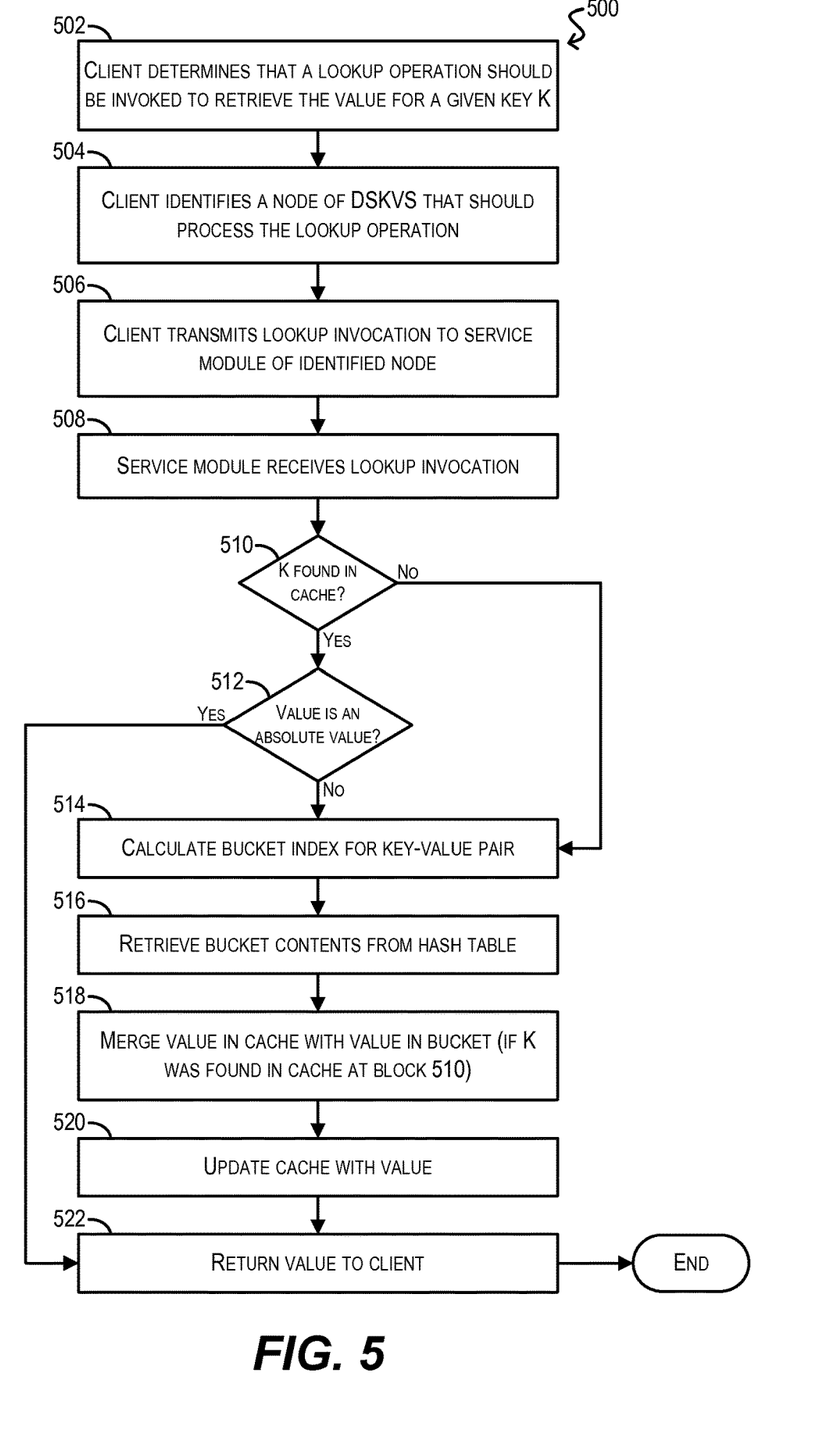
FIG. 5 depicts a flowchart of a key-value lookup process according to an embodiment.

FIG. 5 depicts a flowchart of a process 500 that can be implemented by a service module 106 of DSKVS 100 (in conjunction with a requesting client 104) for executing a key-value lookup operation in accordance with an embodiment. With this process, the service module can leverage in-memory writeback cache 112 to return the requested value without requiring any disk I/O (if the value is cached as an absolute value), or using at most one disk I/O (if the value is not in the cache, or is cached as a delta value).

Starting with block 502, a client 104 can determine that a lookup (e.g., GET) operation should be performed to retrieve a value for a given key K. In response, client 104 can identify a node of DSKVS 100 that should process the lookup operation (block 504). As noted previously, client 104 can perform this step by, e.g., applying a system-level hash function to key K and identifying the node that is mapped to the resulting hash value.

Upon identifying the node at block 504, client 104 can transmit an invocation of the lookup operation to the service module (106) of the node (block 506).

At block 508, service module 106 can receive the lookup invocation from client 108. In response, service module 106 can search for key K in the node's in-memory writeback cache 112 (block 510). If the key is found and its corresponding value in the cache is an absolute value (block 512), service module 106 can return the value to client 104 (block 522) and process 500 can end.

On the other hand, if the key is not found or its corresponding value in the cache is a delta value, service module 106 can calculate, using the node-level hash function, the index of the hash bucket where the key-value pair is stored (block 514) and can retrieve the contents of the bucket identified by the index from on-disk hash table 108 (block 516).

At block 518, service module 106 can merge the value from the cache with the value stored in the bucket to arrive at a final, absolute value (if K was found in the cache at block 510). Service module 106 can then update cache 112 with the value (block 520) and return that value to client 108 (block 522).

As can be seen, process 500 enables fast lookups because service module 106 does not need to access on-disk hash table 108 for a given key K as long as the key's value is cached as an absolute value in in-memory writeback cache 112. This will generally be the case after a first lookup operation for key K, since the absolute value will be added to/updated in cache 112 per block 518. This will also be the case after key K has been flushed to disk per log replay subprocess 300 of FIG. 3, since its absolute value will be updated in cache 112 per block 316. Even if the key's value is not found in cache 112 or is cached as a delta value, service module 106 can retrieve the absolute value from disk using a single read I/O, which can be accelerated by using a solid-state disk as the underlying physical storage device (or some other storage technology that supports high random read performance).

III.D Handling Hash Bucket Overflow

Figure 6:
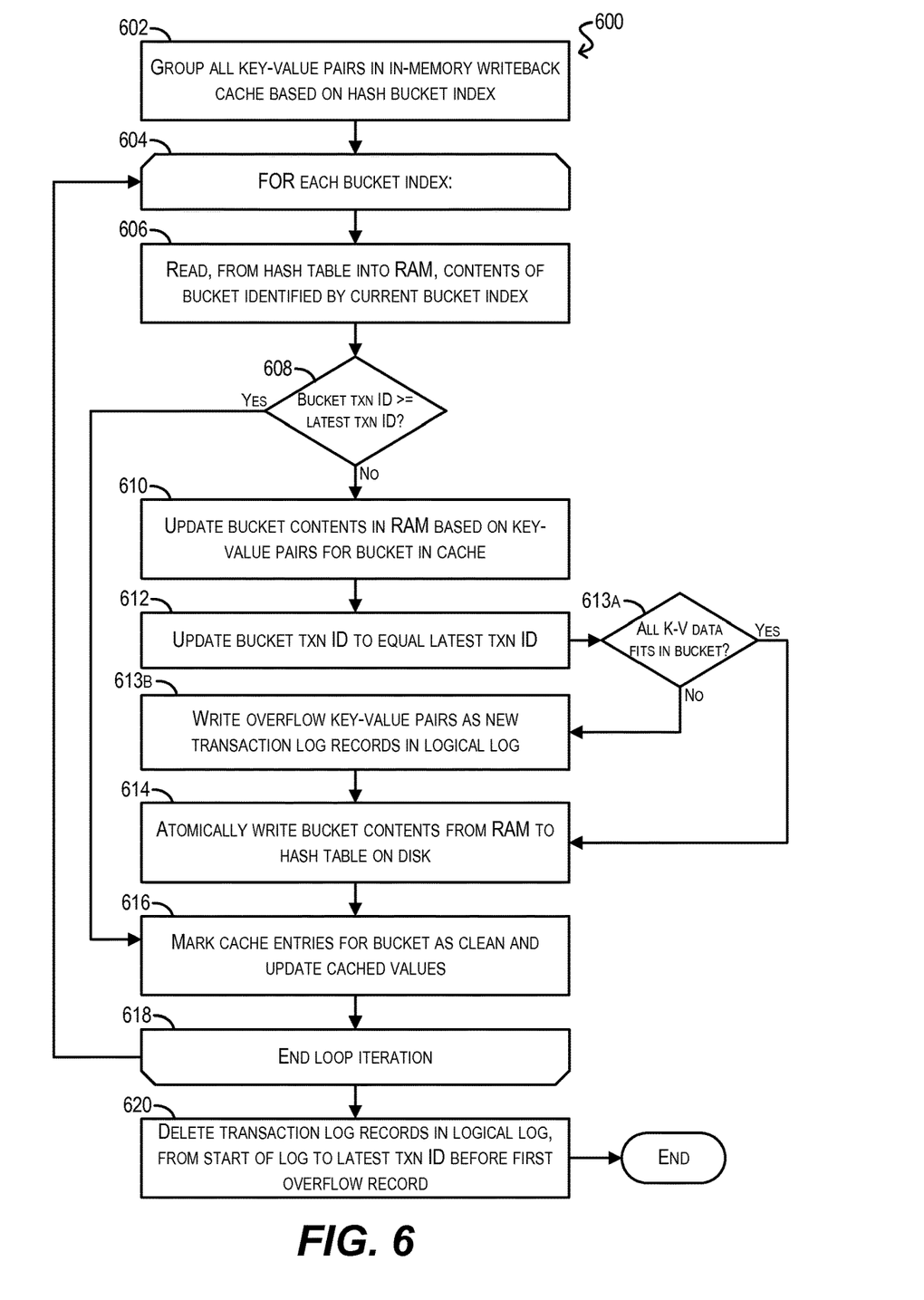
FIG. 6 depicts an alternative version of the update process of FIG. 3 according to an embodiment.

In some scenarios, during log replay subprocess 300 of FIG. 3, service module 106 may find that the key-value data for a given hash bucket cannot fit within the fixed, on-disk size of the bucket. FIG. 6 depicts a modified version (600) of log replay subprocess 300 that addresses this issue by writing overflow key-value pairs to the end of logical log 110.

Blocks 602-612 of FIG. 6 are substantially similar to blocks 302-312 of FIG. 3. At block 613a of FIG. 6, service module 106 can check whether the key-value data for the current bucket can fit within the bucket on disk. If so, subprocess 600 can proceed with blocks 614-618, which are substantially similar to blocks 314-318 of FIG. 3.

However, if the key-value data cannot fit within the bucket on disk, service module 106 can write the overflow key-value pairs as new transaction log records in logical log 110 (block 613b). Service module 106 can then proceed with blocks 614-618. By writing these overflow pairs to logical log 110, service module 106 can ensure they persist across node crashes/reboots. Further, since the overflow pairs also exist in in-memory writeback cache 112, they can be queried by clients 104(1)-104(M). In some embodiments, the entries in cache 112 that correspond to overflow data may need to be tagged with a special flag/identifier so that they are not aged out of the cache until they can be propagated to hash table 108.

Finally, at block 620, service module 106 can delete the transaction log records in logical log 110, from the start of the log to the latest transaction ID before the first overflow record written at block 613b. This ensures that these newly written overflow records are not deleted from logical log 110. The overflow records may be deleted from logical log 110 upon a subsequent invocation of log replay subprocess 600 if service module 106 is able to fit them into their corresponding hash bucket on disk (per block 614) at that time.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing a distributed, scalable key-value store (DSKVS) across a plurality of server nodes, the method comprising:
   receiving, by a server node in the plurality of server nodes, a key-value update operation from a client, the key-value update operation identifying a key-value pair comprising a key K1 and a value V1;
   executing, by the server node, the key-value update operation by:
      writing a transaction log record to a logical log maintained in a nonvolatile storage of the server node, wherein the transaction log record includes the key K1, the value V1, and a transaction identifier; and
      creating or updating a cache entry for key K1 in a cache in a volatile memory of the server node, wherein a value of the cache entry is based on the value V1;
   subsequently to writing the transaction log record and creating or updating the cache entry, transmitting, by the server node to the client, an acknowledgement indicating completion of the key-value update operation;
   upon transmitting the acknowledgment,
   determining that an amount of dirty data in the cache exceeds a threshold; and
   executing, by the server node, a log replay subprocess that takes as input a latest transaction identifier identifying a latest transaction log record in the logical log, the log replay subprocess comprising:
      determining, for each key-value pair in the cache, a bucket index identifying a bucket of a hash table maintained in the nonvolatile storage of the server node, the identified bucket being a hash table bucket in which the key-value pair should be stored;
      grouping all key-value pairs in the cache according to their respective bucket indexes;
      for each determined bucket index:
         reading, from the hash table into the volatile memory, contents of the bucket identified by the bucket index, the contents including the bucket's key-value pairs and a bucket transaction identifier; and
         determining that the bucket transaction identifier is less than the latest transaction identifier;
         updating, in the volatile memory, the bucket's key-value pairs based on the key-value pairs for the bucket held in the cache;
         updating, in the volatile memory, the bucket transaction identifier to be equal to the latest transaction identifier;
         atomically writing the updated key-value pairs and the updated bucket transaction identifier to the hash table;
         marking the key-value pairs for the bucket held in the cache as clean; and
      deleting, from the logical log, transaction log records whose transaction identifier is less than or equal to the latest transaction identifier.

2. The method of claim 1 wherein creating or updating the cache entry comprises:
   if an existing cache entry for the key K1 is present in the cache, merging the value V1 with a corresponding value in the existing cache entry and marking the existing cache entry as dirty,
   else writing the key K1 and the value V1 into a new cache entry and marking the new cache entry as dirty.

3. The method of claim 1 further comprising, prior to atomically writing the bucket's key-value pairs and the bucket transaction identifier to the hash table:
   checking whether all of the updated key-value pairs can fit within the bucket on the nonvolatile storage; and
   if all of the updated key-value pairs cannot fit within the bucket, writing one or more of the updated key-value pairs as new transaction log records in the logical log.

4. The method of claim 1 further comprising:
   upon initialization of the server node, checking whether the logical log is empty; and
   if the logical log is not empty, executing a log recovery process.

5. The method of claim 4 wherein executing the log recovery process comprises:
   for each transaction log record in the logical log comprising a key K2 and a value V2:
      if an existing cache entry for the key K2 is present in the cache, merging the value V2 with a corresponding value in the existing cache entry and marking the existing cache entry as dirty,
      else writing the key K2 and the value V2 into a new cache entry and marking the new cache entry as dirty; and
   executing the log replay subprocess.

6. The method of claim 1 further comprising
receiving, by the server node, a key-value lookup operation from the client, the key-value lookup operation identifying a key K2;
if a cache entry for the key K2 is present in the cache and the value in the cache entry is an absolute value, returning the value to the client,
else:
calculating a bucket index for the key K2;
reading, from the hash table into the volatile memory, contents of the bucket identified by the bucket index, the contents including a value V2 for the key K2;
if a cache entry for the key K2 is present in the cache, merging the value V2 with the value in the cache entry to generate a merged value; and
returning the value V2 or the merged value to the client.

7. A non-transitory computer readable storage medium having stored thereon program code executable by a server node in a plurality of server nodes, the program code embodying a method for implementing a distributed, scalable key-value store (DSKVS) across the plurality of server nodes, the method comprising:
receiving a key-value update operation from a client, the key-value update operation identifying a key-value pair comprising a key K1 and a value V1;
executing the key-value update operation by:
writing a transaction log record to a logical log maintained in a nonvolatile storage of the server node, wherein the transaction log record includes the key K1, the value V1, and a transaction identifier; and
creating or updating a cache entry for key K1 in a cache maintained in a volatile memory of the server node, wherein a value of the cache entry is based on the value V1;
subsequently to writing the transaction log record and creating or updating the cache entry, transmitting, to the client, an acknowledgement indicating completion of the key-value update operation;
upon transmitting the acknowledgment,
determining that an amount of dirty data in the cache exceeds a threshold; and
executing a log replay subprocess that takes as input a latest transaction identifier identifying a latest transaction log record in the logical log, the log replay subprocess comprising:
determining, for each key-value pair in the cache, a bucket index identifying a bucket of a hash table maintained in the nonvolatile storage of the server node, the identified bucket being a hash table bucket in which the key-value pair should be stored;
grouping all key-value pairs in the cache according to their respective bucket indexes;
for each determined bucket index:
reading, from the hash table into the volatile memory, contents of the bucket identified by the bucket index, the contents including the bucket's key-value pairs and a bucket transaction identifier; and
determining that the bucket transaction identifier is less than the latest transaction identifier;
updating, in the volatile memory, the bucket's key-value pairs based on the key-value pairs for the bucket held in the cache;
updating, in the volatile memory, the bucket transaction identifier to be equal to the latest transaction identifier;
atomically writing the updated key-value pairs and the updated bucket transaction identifier to the hash table;
marking the key-value pairs for the bucket held in the cache as clean; and
deleting, from the logical log, transaction log records whose transaction identifier is less than or equal to the latest transaction identifier.

8. The non-transitory computer readable storage medium of claim 7 wherein creating or updating the cache entry comprises:
if an existing cache entry for the key K1 is present in the cache, merging the value V1 with a corresponding value in the existing cache entry and marking the existing cache entry as dirty,
else writing the key K1 and the value V1 into a new cache entry and marking the new cache entry as dirty.

9. The non-transitory computer readable storage medium of claim 7 wherein the method further comprises, prior to atomically writing the bucket's key-value pairs and the bucket transaction identifier to the hash table:
checking whether all of the updated key-value pairs can fit within the bucket on the nonvolatile storage; and
if all of the updated key-value pairs cannot fit within the bucket, writing one or more of the updated key-value pairs as new transaction log records in the logical log.

10. The non-transitory computer readable storage medium of claim 7 wherein the method further comprises:
upon initialization of the server node, checking whether the logical log is empty; and
if the logical log is not empty, executing a log recovery process.

11. The non-transitory computer readable storage medium of claim 10 wherein executing the log recovery process comprises:
for each transaction log record in the logical log comprising a key K2 and a value V2:
if an existing cache entry for the key K2 is present in the cache, merging the value V2 with a corresponding value in the existing cache entry and marking the existing cache entry as dirty,
else writing the key K2 and the value V2 into a new cache entry and marking the new cache entry as dirty; and
executing the log replay subprocess.

12. The non-transitory computer readable storage medium of claim 7 wherein the method further comprises:
receiving a key-value lookup operation from a client, the key-value lookup operation identifying a key K2;
if a cache entry for the key K2 is present in the cache and the value in the cache entry is an absolute value, returning the value to the client,
else:
calculating a bucket index for the key K2;
reading, from the hash table into the volatile memory, contents of the bucket identified by the bucket index, the contents including a value V2 for the key K2;
if a cache entry for the key K2 is present in the cache, merging the value V2 with the value in the cache entry to generate a merged value; and
returning the value V2 or the merged value to the client.

13. A computer system comprising:
a processor;
a volatile memory;
a nonvolatile storage; and a non-transitory computer readable medium having stored thereon program code for implementing a distributed, scalable key-value store (DSKVS), the program code causing the processor to:
receive a key-value update operation from a client, the key-value update operation identifying a key-value pair comprising a key K1 and a value V1;
execute the key-value update operation by:
   writing a transaction log record to a logical log maintained in a nonvolatile storage of the server node, wherein the transaction log record includes the key K1, the value V1, and a transaction identifier; and
   creating or updating a cache entry for key K1 in a cache maintained in a volatile memory of the server node, wherein a value of the cache entry is based on the value V1;
subsequently to writing the transaction log record and creating or updating the cache entry, transmit, to the client, an acknowledgement indicating completion of the key-value update operation;
upon transmitting the acknowledgment,
determine that an amount of dirty data in the cache exceeds a threshold; and
execute a log replay subprocess that takes as input a latest transaction identifier identifying a latest transaction log record in the logical log, wherein program code for executing the log replay subprocess comprises program code that causes the processor to:
   determine, for each key-value pair in the cache, a bucket index identifying a bucket of a hash table maintained in the nonvolatile storage of the server node, the identified bucket being a hash table bucket in which the key-value pair should be stored;
   group all key-value pairs in the cache according to their respective bucket indexes;
   for each determined bucket index:
      read, from the hash table into the volatile memory, contents of the bucket identified by the bucket index, the contents including the bucket's key-value pairs and a bucket transaction identifier; and
      determine that the bucket transaction identifier is less than the latest transaction identifier;
      update, in the volatile memory, the bucket's key-value pairs based on the key-value pairs for the bucket held in the cache;
      update, in the volatile memory, the bucket transaction identifier to be equal to the latest transaction identifier;
      atomically write the updated key-value pairs and the updated bucket transaction identifier to the hash table;
      mark the key-value pairs for the bucket held in the cache as clean; and
      delete, from the logical log, transaction log records whose transaction identifier is less than or equal to the latest transaction identifier.

14. The computer system of claim 13 wherein the program code for creating or updating the cache entry causes the processor to:
if an existing cache entry for the key K1 is present in the cache, merge the value V1 with a corresponding value in the existing cache entry and mark the existing cache entry as dirty,
else write the key K1 and the value V1 into a new cache entry and mark the new cache entry as dirty.

15. The computer system of claim 13 wherein, prior to atomically writing the bucket's key-value pairs and the bucket transaction identifier to the hash table, the processor:
checks whether all of the updated key-value pairs can fit within the bucket on the nonvolatile storage; and
if all of the updated key-value pairs cannot fit within the bucket, writes one or more of the updated key-value pairs as new transaction log records in the logical log.

16. The computer system of claim 13 wherein the program code further causes the processor to:
upon initialization of the computer system, checking whether the logical log is empty; and
if the logical log is not empty, execute a log recovery process.

17. The computer system of claim 16 wherein the program code for executing the log recovery process comprises code that causes the processor to:
for each transaction log record in the logical log comprising a key K2 and a value V2:
   if an existing cache entry for the key K2 is present in the cache, merge the value V2 with a corresponding value in the existing cache entry and marking the existing cache entry as dirty,
   else write the key K2 and the value V2 into a new cache entry and mark the new cache entry as dirty; and
execute the log replay subprocess.

18. The computer system of claim 13 wherein the program code further causes the processor to:
receive a key-value lookup operation from a client, the key-value lookup operation identifying a key K2;
if a cache entry for the key K2 is present in the cache and the value in the cache entry is an absolute value, return the value to the client,
else:
   calculate a bucket index for the key K2;
   read, from the hash table into the volatile memory, contents of the bucket identified by the bucket index, the contents including a value V1 for the key K2;
   if a cache entry for the key K2 is present in the cache, merge the value V2 with the value in the cache entry to generate a merged value; and
   return the value V2 or the merged value to the client.

* * * * *